No. 892,853.　　　　　　　　　　　　　PATENTED JULY 7, 1908.
J. R. KLINE.
PNEUMATIC TIRE FOR VEHICLE WHEELS.
APPLICATION FILED FEB. 20, 1907.
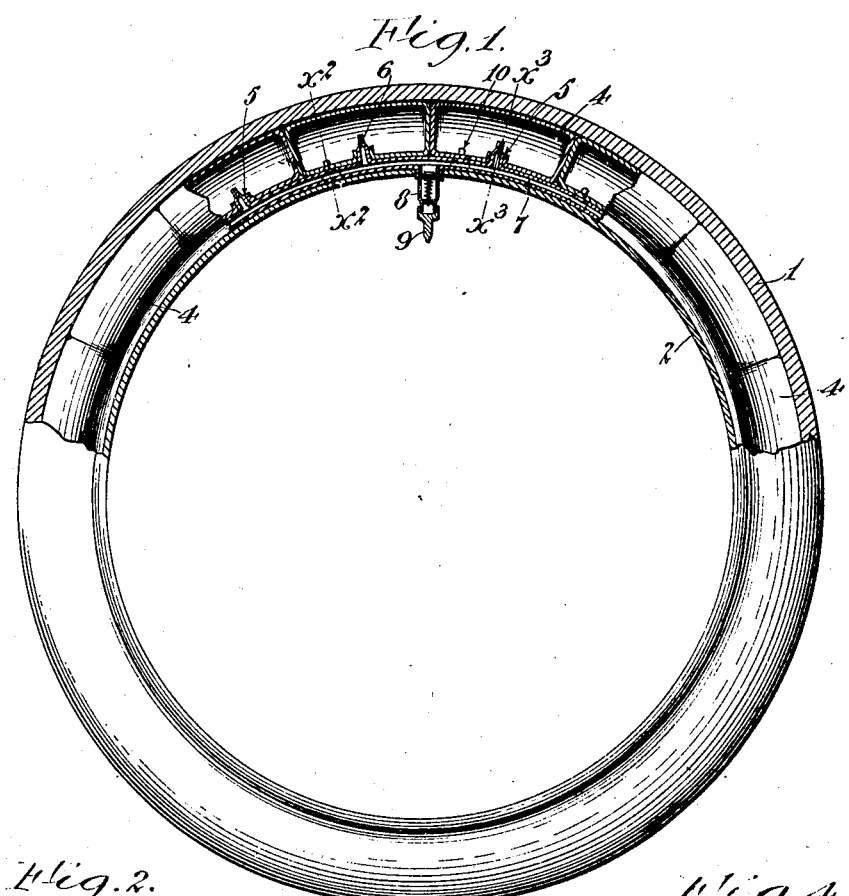
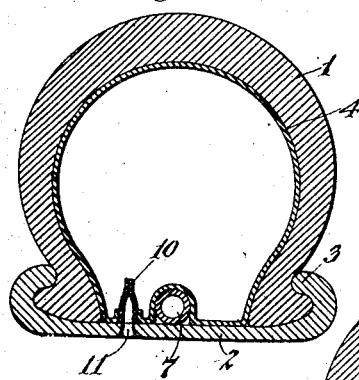
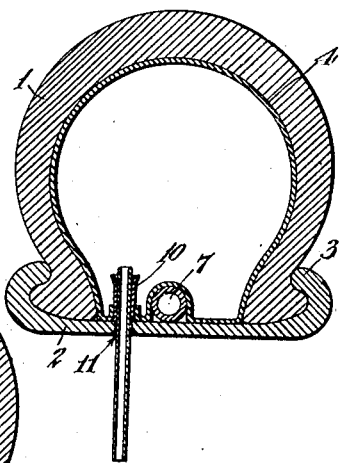
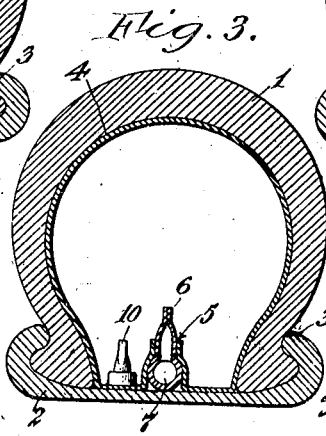
Witnesses:
Inventor
John R. Kline
By Townsend, Lyon, Hackley & Knight
his attys

UNITED STATES PATENT OFFICE.

JOHN R. KLINE, OF LOS ANGELES, CALIFORNIA.

PNEUMATIC TIRE FOR VEHICLE-WHEELS.

No. 892,853.　　　　　Specification of Letters Patent.　　　　Patented July 7, 1908.

Application filed February 20, 1907. Serial No. 358,518.

*To all whom it may concern:*

Be it known that I, JOHN R. KLINE, a citizen of the United States, residing at Los Angeles, in the county of Los Angeles and State of California, have invented a new and useful Pneumatic Tire for Vehicle-Wheels, of which the following is a specification.

This invention is particularly intended for application to automobile wheel tires and particularly to such tires as comprise an outer tube and an inner tubular means, and the main object of the invention is to so construct the inner tubular means that any puncture or injury in any part of the tubular means will not affect the general elasticity of the tire.

Another object of the invention is to facilitate the location or finding of any defect or puncture in the tire.

The invention comprises an inner tubular means made up of cells or sections, each of which is inflated so that escape of air from any one section does not affect the other sections, and in this connection an object of the invention is to provide for inflation of all the sections simultaneously, so that inflation of such a tire can be accomplished as readily and quickly as an ordinary continuous inner tube. In this connection the invention also provides means for releasing the pressure in the several sections of the tire.

In the accompanying drawings:—Figure 1 is a side elevation, partly in section, of the tire. Fig. 2 is a transverse section on line $x^2$ Fig. 1. Fig. 3 is a transverse section on the line $x^3$—$x^3$ in Fig. 1 Fig. 4 is a view similar to Fig. 2 showing the pressure releasing means inserted.

1 designates the outer tube which may be of any usual or suitable construction, and 2 designates the rim of the wheel which is provided with usual means 3 for engaging and holding said outer tube. Said outer tube has the usual annular slot or opening on the inside thereof, so that the inner tubular means can rest directly against the said rim.

The inner tubular means consists of a plurality of sections or cells 4, each of such size and shape as to fill an arc of the outer tube, each cell being closed at each end and the cells being placed end to end within the outer tube. The cells are preferably made of soft vulcanized rubber. Valve means are provided for charging each cell with compressed air. For this purpose each cell has an opening 5 on its inner face to receive and fit tightly around an inlet valve 6 which may be any suitable form of check valve and which communicates with a distributing tube 7 extending around the rim and within the series of cells. It is preferred to indent or groove the cells on the inner faces to receive this distributing tube.

8 designates a valve for supplying air to the distributing tube, said valve being any suitable form of check valve and having the usual screw cap safety closure 9 for closing the same when not in use. Check valve 8 opens inwardly in the usual manner of valves for charging pneumatic tires and the valve 6 of each cell opens inwardly into that cell so as to allow air to flow into the cell but not to flow back into the distributing tube. Each cell or section 4 is further provided with a pressure release valve 10 which opens inwardly. These release valves are placed opposite openings 11 in the rim to enable the valves to be opened and to permit passage of the air in the valves as hereinafter set forth.

The valves 6 and 10 may be of any suitable construction but are preferably of the simple form shown, made by extending a part of the wall of the valved member; for example, by extending a part of the wall of the cell or section in the form of a tube, as shown in Fig. 3, and bringing the two sides of said tube together, while the material is in a plastic state, so that in use the valve will remain closed by the elasticity of the rubber the walls of the valve being collapsible, but will open in a given direction and will remain tightly closed against pressure in the other direction.

In inflating the wheel the cap 9 is removed, any usual pneumatic supply means is connected to the valve 8 and compressed air forced into the distributing tube 7, whence it passes through the valves 6 into all the cells of the tire, inflating the same and causing said cells to press firmly against the outer tube, and causing the ends of the cells to press firmly against one another. In case of a puncture in any section the air will escape therefrom but will not affect the other sections which will still retain their elasticity, and by making the sections sufficiently short it is possible to thus obtain a tire which is not rendered inoperative by a single puncture, but can be used temporarily until it is possible to remove or repair the tire.

In repairing the tire the sectional construction is an advantage in the first place in enabling the location of the puncture to be determined immediately by mere inspection, and in the second place if the puncture is so severe as to permanently injure the rubber or to prevent effective repair of the rubber, the injured cell may be discarded and replaced by a perfect one with slight expense.

When it is desired to remove the tire for repairs, it is necessary to release the pressure therein, as such pressure holds the tire tightly in place and prevents removal. Before removing the tire, a suitable tool such as a tube of sufficiently small diameter is inserted through the openings 11 in the rim, penetrating the release valves and permitting the air to flow through the tube so as to discharge or release the compressed air in the section or cell. This operation may be quickly performed in all the tubes. If desired, however, separate charging valves may be used for the separate sections or cells and said charging valves may be used also to discharge the cells by pressing in the ball of the valve.

What I claim is:—

1. A pneumatic tire comprising an outer tube and inner tubular means having a plurality of sections formed as elastic cells placed end to end, each cell forming a pneumatic chamber, and means for inflating all of said cells simultaneously comprising a distributing tube having an inwardly opening check valve, a check valve opening inwardly from the distributing tube into each cell, and a check valve opening inwardly in each cell from without the distributer tube and accessible from without the distributer tube to permit forcible opening thereof.

2. A pneumatic tire comprising an outer tube and inner tubular means having a plurality of sections formed as elastic cells placed end to end, each cell forming a pneumatic chamber, and means for inflating all of said cells simultaneously, said means comprising a distributing tube provided with a plurality of check valves opening inwardly into the respective cells and also provided with a check valve opening inwardly into the said distributing tube a rim supporting the tire, said cells resting against said rim, and each cell having an inwardly extending valve tube with collapsible walls, said rim having a perforation opposite each valve tube to enable access thereto for the forcible opening of each valve tube.

In testimony whereof, I have hereunto set my hand at Los Angeles, California, this sixth day of February, 1907.

JOHN R. KLINE.

In presence of—
 JOHN R. KLINE,
 FRANK L. A. GRAHAM.